United States Patent Office 3,093,676
Patented June 11, 1963

3,093,676
ALPHA-CYANOALKYL-AROMATIC-METHYL
COMPOUNDS AND THEIR PRODUCTION
John G. Abramo and Earl C. Chapin, Springfield, Mass.,
assignors to Monsanto Chemical Company, St. Louis,
Mo., a corporation of Delaware
No Drawing. Filed May 18, 1959, Ser. No. 813,636
2 Claims. (Cl. 260—465)

The present invention relates to aromatic compounds and more particularly to the production of alpha-cyanoalkyl-aromatic-methyl cyanides having the structure:

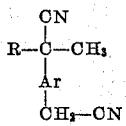

wherein Ar is an aromatic hydrocarbon and R is selected from the class consisting of hydrogen and methyl radical.

Accordingly, it is a principal object of this invention to produce alpha-cyanoalkyl-aromatic-methyl cyanides.

Another object is to provide a simple method by which to provide these dicyanides.

Other objects of the invention will in part be obvious and will in part appear hereinafter.

The objects of the invention are attained by reacting an alpha-haloalkyl-aromatic-methyl halide, having the structure:

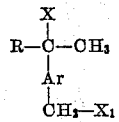

with a base metal cyanide in a suitable medium, wherein throughout Ar is an aromatic radical, R is selected from the class consisting of hydrogen and methyl radical and X and $X_1$ are halogens.

The following examples are given in illustration of the invention. Where parts are mentioned, parts by weight are intended unless otherwise described.

Example I

Ninety-five grams of p-(alpha-chloroethyl)benzyl chloride is added dropwise over a period of one hour to a solution of 75 grams of sodium cyanide in 250 ml. of water and 250 ml. of methanol. The reaction mixture is then heated to reflux temperature and held for 7 hours. At the end of this period, the reaction mixture which is very dark colored is diluted with 500 ml. of water and extracted with five 150 ml. portions of benzene. The benzene extracts are combined and washed with water until the wash water is neutral to litmus paper. The washed extract is then dried over magnesium sulfate. The desiccant is filtered off and benzene is removed by distillation. The product is distilled under vacuum after the benzene has been distilled off and following a small amount of fore-run, 20 grams of a colorless liquid boiling at 143° C./0.4 mm. Hg are collected. Elemental analysis and infrared analysis identify this material as p-(alpha-cyanoethyl)benzyl cyanide.

Example II

A solution of 50 grams of sodium cyanide in 200 ml. of water and 200 ml. of methanol is heated to 50° C. Fifty grams of 1-(alpha-chloroethyl)-4-(chloromethyl)-naphthalene is then added in small portions over a one-hour period. The reaction mixture is maintained at 50° C. for 6 hours after addition has been completed. At the end of this period the mixture is filtered in a Büchner funnel to remove precipitated salts, diluted with 200 ml. of water and extracted with three 100 ml. portions of benzene. The benzene extracts are washed with water until the wash water is neutral to litmus. The solution is then dried with magnesium sulfate, filtered and evaporated to dryness in an evaporating dish. The solid material remaining is recrystallized with ethanol. The white solid which results analyzes correctly for 1-(alpha-cyanoethyl)-4-(cyanomethyl)naphthalene.

Example III

A solution of 60 grams of p-(alpha-chloroisopropyl)-benzyl chloride in 150 ml. of 95% alcohol is added dropwise to a solution of 35 grams of sodium cyanide in 100 ml. of water and 100 ml. of ethanol maintained under stirring and refluxing. After addition is completed, refluxing and stirring are continued for 3 hours. The reaction mixture, which is a dark liquid at this point, is filtered, poured into a separatory funnel and extracted with three 150 ml. portions of benzene. The benzene extracts are collected and washed 3 times with 200 ml. portions of water. Distillation of the benzene is then carried out in a distillation apparatus evacuated to 20 ml. of Hg pressure. After the benzene has been distilled, the pressure in the apparatus is lowered to 0.3 mm. Hg pressure and distillation continued. A small amount of liquid boiling up to 155° C. is collected and discarded, and the main fraction boiling 155° to 163° C. at 0.3 mm. Hg is collected and analyzed. Elemental and infrared analysis are consistent with the expected values for p-(alpha-cyanoisopropyl)benzyl cyanide.

The alpha-cyanoalkyl-aromatic-methyl cyanides of the present invention having the structure:

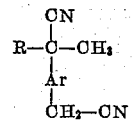

can be produced by reacting (a) the corresponding alpha-halomethyl compound more particularly an alpha-haloalkyl-aromatic-methyl halide of the structure:

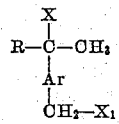

with (b) a base metal cyanide, wherein throughout Ar is an aromatic radical, R is selected from the class consisting of hydrogen and methyl radical and X and $X_1$ are halogens.

The simplest examples of the sponsored cyanides, more specifically dicyanides, are the o-, m-, and p-(alpha-cyanoethyl)-benzyl cyanides. here R is a methyl radical, these are the o-, m-, and p-(alpha-cyanoisopropyl)benzyl cyanides. With variations carried out in the aromatic radical Ar, as for example when this radical is a biphenyl, naphthyl, or anthryl radical, additional dicyanide products result. Examples of these include alpha-cyanoethylnaphthyl-methyl cyanides, alpha-cyanoethylanthryl-methyl cyanides, and when the alkyl cyanide substituent is an isopropyl group representative products are the alpha-cyanoisopropylbiphenyl-methyl cyanides, alpha-cyanoisopropyl-naphthyl-methyl cyanides and alpha-cyanoisopropylanthryl-methyl cyanides including the various isomers of the preceding which result from variations practiced in the positioning of the two major substituents, to wit: (1) the alpha-cyanoalkyl substituent which can be either an alpha-cyanoethyl radical or an alpha-cyanoisopropyl radical and (2) the cyanomethyl substituent. In the matter of substituents, additional nuclear substituents of a secondary nature, such as halogens and alkyl radicals, the latter represented by methyl, ethyl, and the like, can be accommodate on the various aromatic radicals indicated by the symbol Ar.

The corresponding alpha-haloalkyl-aromatic-methyl halides which can serve as starting materials from which to obtain the desired cyanide products of the present invention have the structure:

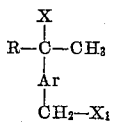

wherein Ar is an aromatic radical, R is selected from the class consisting of hydrogen and methyl radical and X and $X_1$ are halogens. The halogen symbolized as $X_1$, contained in the haloalkyl substituent (either haloethyl or haloisopropyl), is in the alpha position. In either case, X or $X_1$, can be bromine, chlorine, fluorine or iodine but are preferably chlorine. Illustrative of the haloalkyl-aromatic-methyl halides which can be used is the p-(alpha-chloroethyl)benzyl chloride which is used to produce p-(alpha-cyanoethyl)benzyl cyanide. The dihalide starting materials can be produced by a two-step process in which (a) the corresponding alkyl-aromatic hydrocarbon is halomethylated to yield the corresponding alkyl-aromatic-halomethyl compound which is (b) then halogenated to the corresponding alpha-haloalkyl-aromatic-halomethyl compound. To illustrate, ethyl benzene is chloromethylated to yield p-ethylbenzyl chloride and subsequent chlorination yields p-(alpha-chloroethyl)benzyl chloride. Other alpha-haloalkyl-aromatic-methyl halides can be obtained in this manner for use as starting materials.

As previously described, the desired dicyanide can be obtained by causing a corresponding alpha-haloalkyl-aromatic-methyl halide to react with a base metal cyanide in the presence of a solvent for the reactants. The base metal cyanides include the alkali metal cyanides such as sodium cyanide, potassium cyanide, lithium cyanide, etc., alkaline earth metal cyanides such as calcium cyanide, barium cyanide, strontium cyanide and the like. In a lesser preferred embodiment, an alpha-haloalkyl-aromatic-methyl halide corresponding to the desired dicyanide is caused to react with hydrogen cyanide in the presence of an acid acceptor such as the carbonate of one of the above metals. The solvent can be water or various organic solvents such as methanol, ethanol, acetone, methyl ethyl ketone and mixtures of the same. Their choice will be reflective of the desired temperatures of reaction and solvent properties in relation to the reactants. The use of the term "solvent" does not indicate that the reactants must be completely solvated in the same. Rather it indicates a medium which allows sufficient contact between reactants as to permit reaction to take place. Potassium cyanide and sodium cyanide perform well as the base metal cyanide in the presence of water or a mixture of water and ethanol. The amount of base metal cyanide to be used is determined by the number of displaceable halogens on the principal substituents of the haloalkyl-aromatic-methyl halide starting material. These are two in number. In addition, it is well to use an excess of the cyanide. Consequently then the preferred procedure calls for using an amount of base metal cyanide in excess of twice the molar amount of halomethyl-aromatic-methyl halide to be reacted. The temperature at which the reaction can be carried out ranges generally between 50°–200° C. with a further preference of 90°–110° C. It is further suggested that the reaction be carried out under reflux conditions and while subatmospheric, atmospheric or superatmospheric pressure conditions can be used atmospheric pressure is most desirable.

The alpha-cyanoalkyl-aromatic-methyl cyanides of the present invention can be subjected to hydrolysis reactions to produce difunctional aromatic materials, the functional groups of which are carboxylic in nature. These then can be used in condensation reactions with diols and diamines with which to produce synthetic polymeric materials having particular usefulness in film, fiber and surface coating applications. Additionally, the alpha-cyanoalkyl-aromatic-methyl cyanides of the present invention can be used singly or in mixture with their beta-isomer counterparts disclosed and claimed in our copending application S.N. 768,826 filed October 22, 1958, now abandoned.

It will thus be seen that the objects set forth above among those made apparent from the preceding description are efficiently attained, and since certain changes may be made in carrying out the above process and in the dicyanide products, without departing from the scope of the invention, it is intended that all matter contained in the above description shall be interpreted as illustrative and not in a limting sense.

What is claimed is:
1. A class of alpha-cyanoalkyl-aromatic methyl cyanides having the structure:

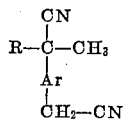

wherein Ar is an aromatic hydrocarbon radical selected from the class consisting of naphthylene and anthrylene and R is selected from the class consisting of hydrogen and the methyl radical.

2. 1-(alpha-cyanoethyl)-4-(cyanomethyl)naphthalene.

References Cited in the file of this patent
UNITED STATES PATENTS

| | | |
|---|---|---|
| 2,497,673 | Kirk | Feb. 14, 1950 |
| 2,779,781 | Copelin et al. | Jan. 29, 1957 |
| 2,919,277 | Berther | Dec. 29, 1959 |

FOREIGN PATENTS

| | | |
|---|---|---|
| 869,204 | Germany | Mar. 5, 1953 |

OTHER REFERENCES

Beilstein, Handbook der Organischen Chemie, volume 9, pages 874–875 (1926); volume 9, Second Supplement, page 632 (1949). (Copies of above in Sci. Library.)